US011619929B2

(12) United States Patent
Matsumoto et al.

(10) Patent No.: US 11,619,929 B2
(45) Date of Patent: Apr. 4, 2023

(54) AUTOMATIC OPERATION CONTROL METHOD AND SYSTEM

(71) Applicant: Hitachi, Ltd., Tokyo (JP)

(72) Inventors: Morio Matsumoto, Tokyo (JP); Fumiya Kudo, Tokyo (JP); Toshihiro Kujirai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 16/845,522

(22) Filed: Apr. 10, 2020

(65) Prior Publication Data
US 2020/0333775 A1 Oct. 22, 2020

(30) Foreign Application Priority Data

Apr. 17, 2019 (JP) .............................. JP2019-078737

(51) Int. Cl.
*G05B 19/418* (2006.01)
*G05B 19/4069* (2006.01)
*G05B 17/02* (2006.01)

(52) U.S. Cl.
CPC ....... *G05B 19/41885* (2013.01); *G05B 17/02* (2013.01); *G05B 19/4069* (2013.01)

(58) Field of Classification Search
CPC .............. G05B 19/41885; G05B 17/02; G05B 19/4069
See application file for complete search history.

(56) References Cited

U.S. PATENT DOCUMENTS

2004/0102891 A1 5/2004 Ehara
2016/0035150 A1* 2/2016 Barfield, Jr. ....... G05B 23/0254
701/29.3
(Continued)

FOREIGN PATENT DOCUMENTS

CN 107798428 A 3/2018
CN 107943022 A 4/2018
(Continued)

OTHER PUBLICATIONS

Chinese-language Office Action issued in Chinese Application No. 202010248015.5 dated Jan. 11, 2022 with English translation (15 pages).

*Primary Examiner* — Ronald D Hartman, Jr.
(74) *Attorney, Agent, or Firm* — Crowell & Moring LLP

(57) ABSTRACT

An object of the present invention is to reduce an error between an actual machine and a simulation by removing the influence of overlearning of an adjustment by a mathematically-described function, and to optimize automatic operation control of the machine. An automatic operation control system for controlling an automatic operation of a machine sets a first model showing a relation between a control signal string input to the machine on the basis of a mathematically-described function and data output from the machine controlled in accordance with the control signal string. In a learning process including learning the automatic operation control of the machine, the system executes learning using the first model until a first condition is satisfied. After the first condition is satisfied, the learning is executed using a second model that is a model after the first model is changed one or more times until a second condition meaning overlearning is satisfied or the learning is finished without satisfying the second condition.

13 Claims, 9 Drawing Sheets

(56) References Cited

U.S. PATENT DOCUMENTS

2016/0349330 A1* 12/2016 Barfield, Jr. .......... G01R 31/389
2020/0082248 A1*  3/2020 Villegas ................ B60W 40/02
2020/0117953 A1*  4/2020 Cooper ................ G06V 10/774

FOREIGN PATENT DOCUMENTS

| CN | 108657189 A |   | 10/2018 |   |   |
|----|-------------|---|---------|---|---|
| CN | 108803604 A |   | 11/2018 |   |   |
| CN | 109358614 A |   | 2/2019  |   |   |
| CN | 109597317 A |   | 4/2019  |   |   |
| JP | 2004-178247 A |   | 6/2004 |   |   |
| JP | 2007-161393 A |   | 6/2007 |   |   |
| JP | 2010257269 A | * | 11/2010 | ............... | G06N 5/04 |
| WO | WO-2019133908 A1 | * | 7/2019 | ............... | G06N 3/08 |
| WO | WO-2020016337 A1 | * | 1/2020 | ........... | G05D 1/0088 |
| WO | WO-2020153623 A1 | * | 7/2020 | ........... | B23Q 3/1552 |
| WO | WO-2021164137 A1 | * | 8/2021 | ............. | B23Q 17/09 |

* cited by examiner

AUTOMATIC OPERATION CONTROL METHOD AND SYSTEM

BACKGROUND

The present invention generally relates to automatic operation control of a machine.

In automatic operation control of a machine such as a large-size industrial machine, a simulation emulating the actual machine is used to find the optimum automatic operation control method, and automatic operation control realized on the simulation is verified by the actual machine. As methods of finding the optimum control, there are optimization calculation, reinforcement learning, and the like.

As an example of the large-size industrial machine, there is an overhead crane, and automatic operation control of the overhead crane is exemplified in Japanese Unexamined Patent Application Publication No. 2007-161393. According to Japanese Unexamined Patent Application Publication No. 2007-161393, a conveyance simulation of a physical model is used for specific conveyance, and an automatic operation control step is generated to prevent a conveyance object from swinging.

However, the actual machine behaves differently from the simulation due to an error between the actual machine and the simulation, and it is difficult to obtain a desired result. Therefore, an adjustment in the actual machine is essential, but it is difficult to conduct an experiment frequently using the actual machine of the large-size industrial machine because a heavy burden is imposed.

In order to avoid this problem, it is conceivable to generate a simulation so as to be close to the actual machine as described in Japanese Unexamined Patent Application Publication No. 2004-178247.

SUMMARY

It is conceivable to generate a precise simulation as described in Japanese Unexamined Patent Application Publication No. 2004-178247 in an overhead crane on the basis of real data of a standard control signal string, and an adjustment using a mathematically-described function is carried out to fill the gap between the actual machine and the simulation. In the adjustment, overlearning of a simulation due to insufficient data of the actual machine and no reproducibility has been known.

In the case where a simulation overlearns, the simulation is strongly dependent on parameters such as a control signal string, a conveyance distance, the weight of a conveyance object, and the environment where actual machine verification was performed when generating an adjustment simulation. Therefore, when the parameters such as the control signal string, the conveyance distance, and the environment change, there is a problem that the result of the simulation largely fluctuates, increasing an error between the simulation and the actual machine. Therefore, a problem that automatic operation control is not realized other than the control environment where the adjustment was carried out arises.

Further, in the case where reinforcement learning is used to search for a control signal string of automatic operation control, there is a problem that a reward obtained in the reinforcement learning largely fluctuates in the overlearned simulation and the learning does not make progress. Therefore, when realizing the automatic operation control by the reinforcement learning, it is necessary to prevent the influence of the overlearning from being included in a simulation used when generating a control signal string.

The influence of the overlearning of the adjustment by the mathematically-described function can also cause a problem in the case where learning other than the reinforcement learning is used to search for a control signal string of automatic operation control.

Accordingly, an object of the present invention is to reduce an error between an actual machine and a simulation by removing the influence of overlearning of an adjustment by a mathematically-described function and to optimize automatic operation control of the machine.

An automatic operation control system for controlling an automatic operation of a machine sets a first model showing a relation between a control signal string input to the machine on the basis of a mathematically-described function and data output from the machine controlled in accordance with the control signal string. In a learning process including learning the automatic operation control of the machine, the system executes learning using the first model until a first condition is satisfied. After the first condition is satisfied, the learning is executed using a second model that is a model after the first model is changed one or more times until a second condition meaning overlearning is satisfied or the learning is finished without satisfying the second condition.

According to the present invention, an error between an actual machine and a simulation can be reduced by removing the influence of overlearning of an adjustment by a mathematically-described function, and thus automatic operation control of the machine can be optimized.

DETAILED DESCRIPTION

Figure 1:
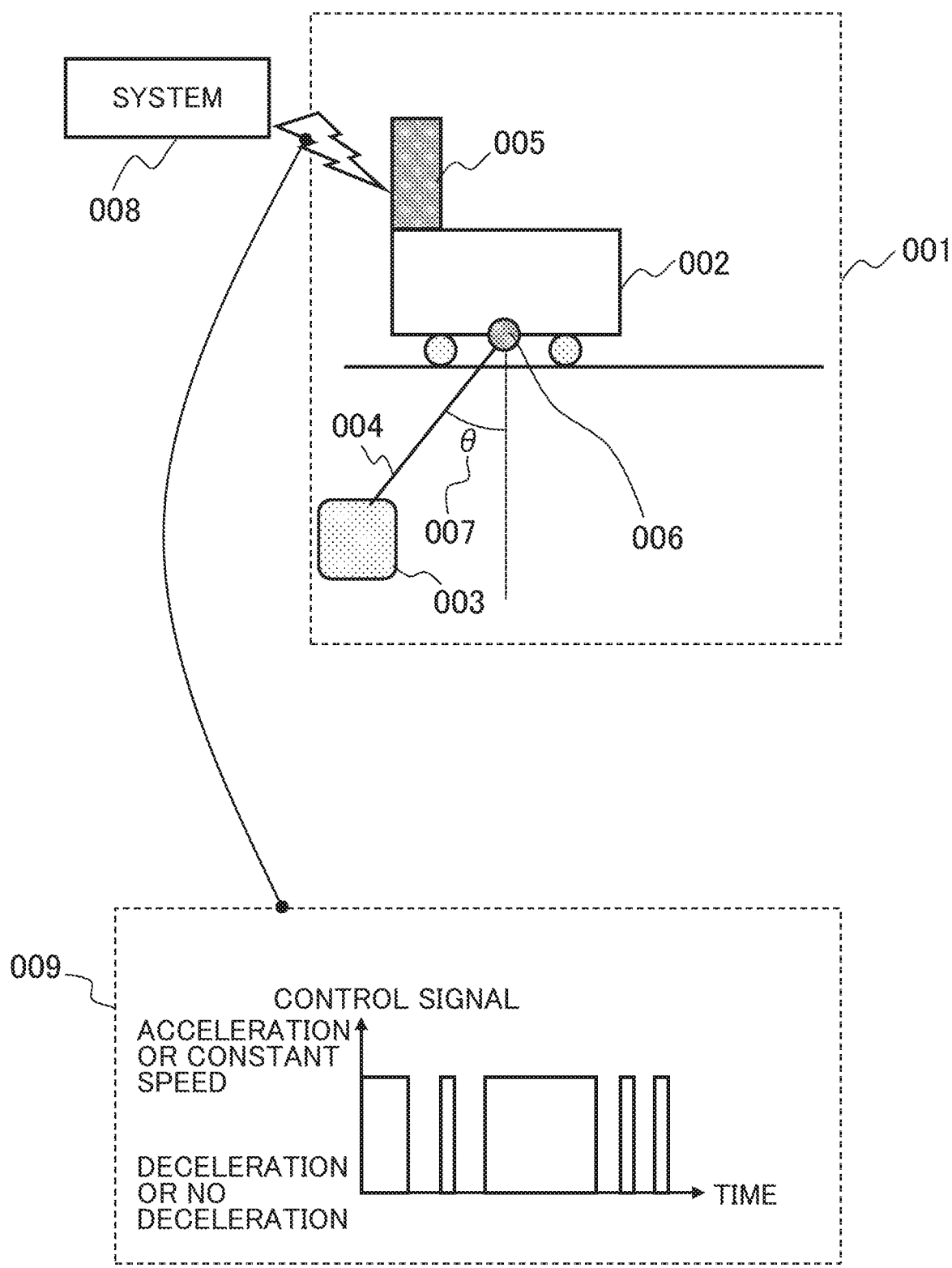
FIG. 1 is a schematic diagram for showing an example of an outline of automatic operation control.

In the following description, an "interface device" may be one or more interface devices. The one or more interface devices may be at least one of the followings.

One or More I/O (Input/Output) Interface Devices

The I/O (Input/Output) interface device is an interface device for at least one of an I/O device and a computer for remote display. The I/O interface device for a computer for display may be a communication interface device. At least one I/O device may be a user interface device, for example, anyone of an input device such as a keyboard or a pointing device and an output device such as a display device.

One or More Communication Interface Devices

The one or more communication interface devices may be one or more communication interface devices (for example, one or more NICs (Network Interface Cards)) of the same kind, or two or more communication interface devices (for example, NICs and HBAs (Host Bus Adapters)) of different kinds.

Further, in the following description, a "memory" is one or more memory devices, and may be typically a main storage device. At least one memory device of the memories may be a volatile memory device or a non-volatile memory device.

Further, in the following description, a "permanent storage device" is one or more permanent storage devices. The permanent storage device is typically a non-volatile storage device (for example, an auxiliary storage device), and is specifically, for example, a hard disk drive (HDD) or a solid state drive (SSD).

Further, in the following description, a "storage device" may be a memory and at least a memory of a permanent storage device.

Further, in the following description, a "processor" is one or more processor devices. At least one processor device is typically a microprocessor device such as a central processing unit (CPU), but may be a processor device of another kind such as a graphics processing unit (GPU). At least one processor device may be a single-core processor or a multi-core processor. At least one processor device may be a processor core. At least one processor device may be a processor device in a broad sense such as a hardware circuit (for example, a field-programmable gate array (FPGA) or an application specific integrated circuit (ASIC)) that performs some or all of a process.

Further, in the following description, a function will be described with an expression of "kkk unit" in some cases. However, the function may be realized in such a manner that one or more computer programs are executed by a processor, or may be realized by one or more hardware circuits (for example, FPGAs or ASICs). In the case where the function is realized in such a manner that a program is executed by a processor, a set process is performed while appropriately using a storage device and/or an interface device, and thus the function may be at least a part of the processor. A process described using a function as the subject may be a process performed by a processor or a device having the processor. A program may be installed from a program source. The program source may be, for example, a program distribution computer or a computer readable recording medium (for example, a non-transitory recording medium). The description of each function is an example, and a plurality of functions may be integrated into one function or one function may be divided into a plurality of functions.

Hereinafter, some embodiments will be described using the drawings.

First Embodiment

FIG. 1 is a diagram for showing an example of an outline of automatic operation control according to a first embodiment.

An "overhead crane" 001 is an example of an industrial machine for automatic operation control. The "overhead crane" 001 includes a movable "wagon" 002, a "conveyance object" 003, a windable "string" 004, a "communicable control device" 005, and a "sensor" 006. The "sensor" 006 measures the speed and position of the "wagon" 002, the length of the "string" 004, and a "swing angle θ" 007. The measurement values (the speed and position of the "wagon" 002, the length of the "string" 004, and the "swing angle θ" 007 in the embodiment) of the "sensor" 006 are transmitted to a "system" 008. The "system" 008 is an automatic operation control system according to the embodiment.

One "sensor" 006 is provided in FIG. 1, but a plurality of "sensors" may be provided. The "sensors" 006 may be provided in each of the "wagon" 002, the "string" 004, and the "conveyance object" 003.

The "swing angle θ" 007 is defined as an angle between a straight line extending from the "wagon" 002 in the vertical direction and the linear "string" 004. However, the definition of the swing angle is not limited to this. For example, the definition of the swing angle may be defined in the horizontal direction of the "string" 004 and the "wagon" 002, namely, (90 degrees-θ) may be the "swing angle" in the case of FIG. 1.

The automatic operation control of the "overhead crane" 001 using a control signal string is realized in such a manner that the "communicable control device" 005 receives the control signal string that is an hourly string of control signals for preliminarily instructing acceleration and deceleration of the "wagon" 002, for example, a "control signal string" 009 from the "system" 008, and performs control in accordance with the "control signal string".

According to the "control signal string" 009 of a concrete example, when the "wagon" 002 reaches the maximum speed at the time of acceleration control, the "wagon" 002 performs constant speed driving at the maximum speed by stopping the acceleration. At the time of deceleration, when the speed of the wagon becomes 0, the wagon does not decelerate any more.

The "communicable control device" 005 may be a device that receives, for example, the transmitted "control signal string" 009 using a PLC (Programmable Logic Controller) or a motion controller, outputs the received signal to an inverter, converts the signal using the inverter into the form of a control signal string for actually controlling the "wagon" 002 of the "overhead crane" 001, and controls the wagon according to the signal string. It should be noted that the example of the "communicable control device" 005 is not limited to the above-described device. In addition, the "communicable control device" 005 is mounted in the "wagon" 002 in FIG. 1. However, it is not necessary to be mounted in the "wagon" 002.

Figure 2:
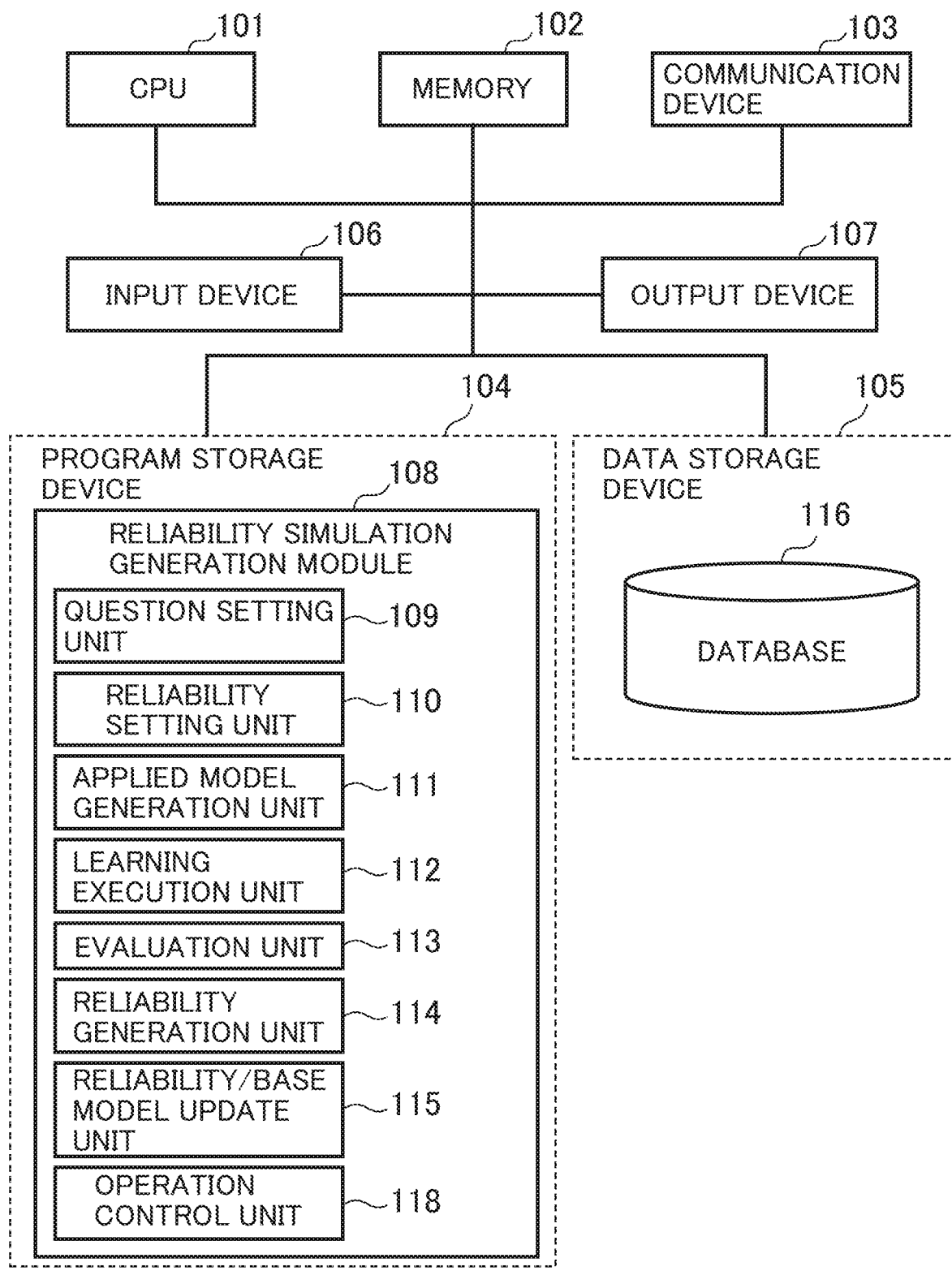
FIG. 2 is a block diagram for showing an example of a configuration of a "system" 008.

FIG. 2 is a block diagram for showing an example of a configuration of the "system" 008.

With reference to FIG. 2, the "system" 008 has a "memory" 102, a "communication device" 103, a "program storage device" 104, a "data storage device" 105, an "input device" 106, an "output device" 107, and a "CPU" 101 connected thereto. The "communication device" 103 is an example of an interface device. The "memory" 102, the "program storage device" 104, and the "data storage device" 105 are examples of storage devices. The "CPU" 101 is an example of a processor.

The "program storage device" 104 is a device that stores one or more computer programs executed by the "CPU" 101. The "program storage device" 104 stores, for example, a "reliability simulation generation module" 108.

Figure 4:
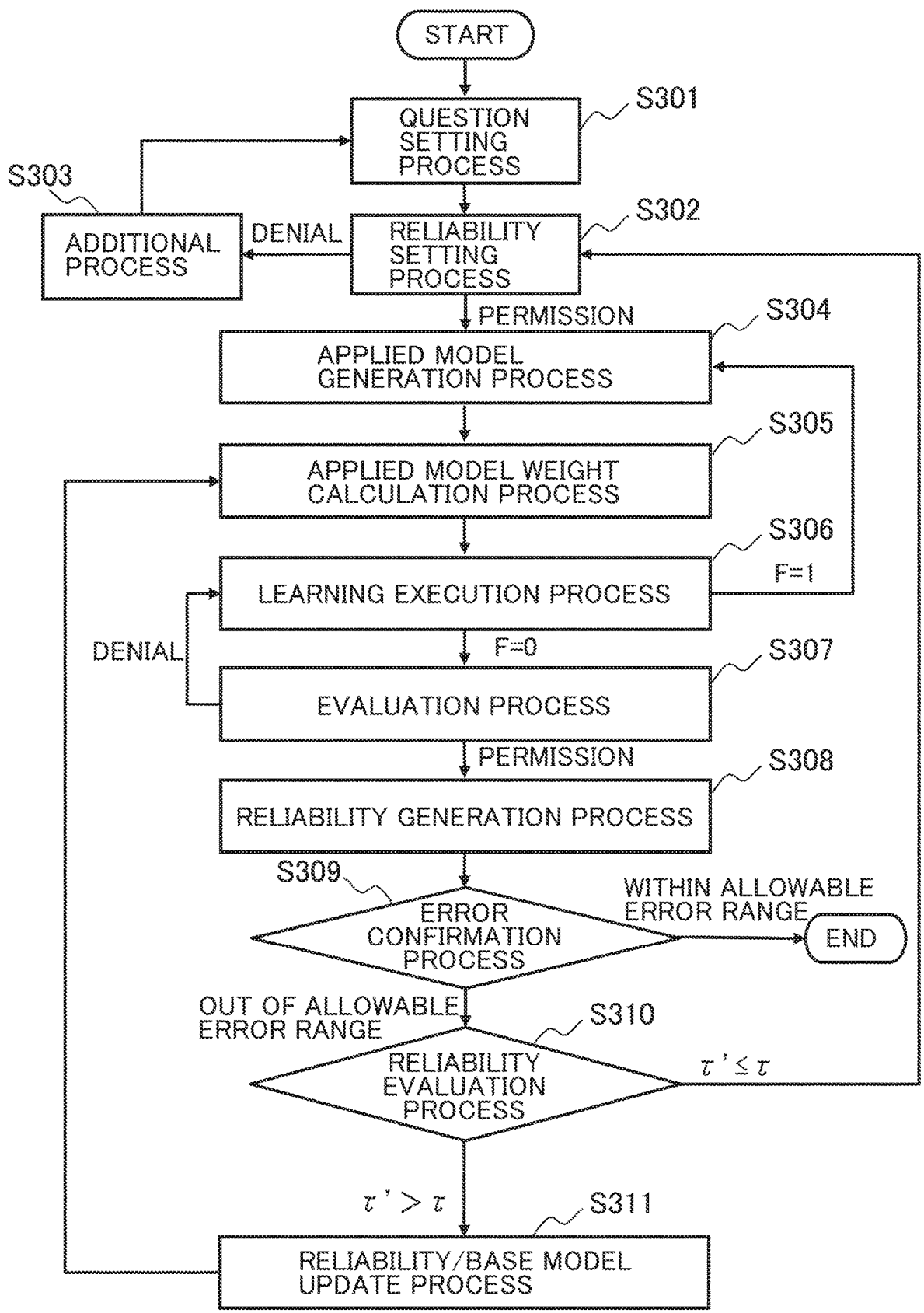
FIG. 4 is a flowchart for showing an example of a process executed by a "reliability simulation generation module" 108.

The "reliability simulation generation module" 108 is a software module that performs a process exemplified in FIG. 4. The software module is configured using one or more software programs, and is software or a software component realizing a bundle of functions.

The "reliability simulation generation module" 108 has a "question setting unit" 109, a "reliability setting unit" 110, an "applied model generation unit" 111, a "learning execution unit" 112, an "evaluation unit" 113, a "reliability generation unit" 114, a "reliability/base model update unit" 115, and an "operation control unit" 118.

The "data storage device" 105 is a device that stores data. The "data storage device" 105 stores, for example, a "database" 116.

It should be noted that the "program storage device" 104 and the "data storage device" 105 are herein exemplified as different devices. However, the present invention is not limited to this configuration, and the "program storage device" 104 and the "data storage device" 105 may be the same device.

The "reliability simulation generation module" 108 inputs and outputs data into/from the "database" 116 stored in the "data storage device" 105.

The "CPU" 101 uses, for example, the "memory" 102 as a work area, and reads data stored in the "data storage device" 105. In addition, the "CPU" 101 writes, for example, data of an arithmetic process and an arithmetic result into the "data storage device" 105.

The "communication device" 103 transmits, for example, information processed by the "CPU" 101 to an external device such as the "communicable control device" 005 through, for example, a communication network. In addition, the "communication device" 103 transmits, for example, information received through a communication network to the "CPU" 101.

The "input device" 106 is a user interface device such as a keyboard and a mouse.

The "output device" 107 is a user interface device such as a display device and a printer.

It should be noted that a terminal connected through the "communication device" 103 may have the "input device" 106 and the "output device" 107, may process data in accordance with a request from the terminal, and may output a processing result to the terminal.

The "system" 008 may be physically constructed on one computer, or may be constructed on a logical partition configured on a plurality of computers.

Figure 3:
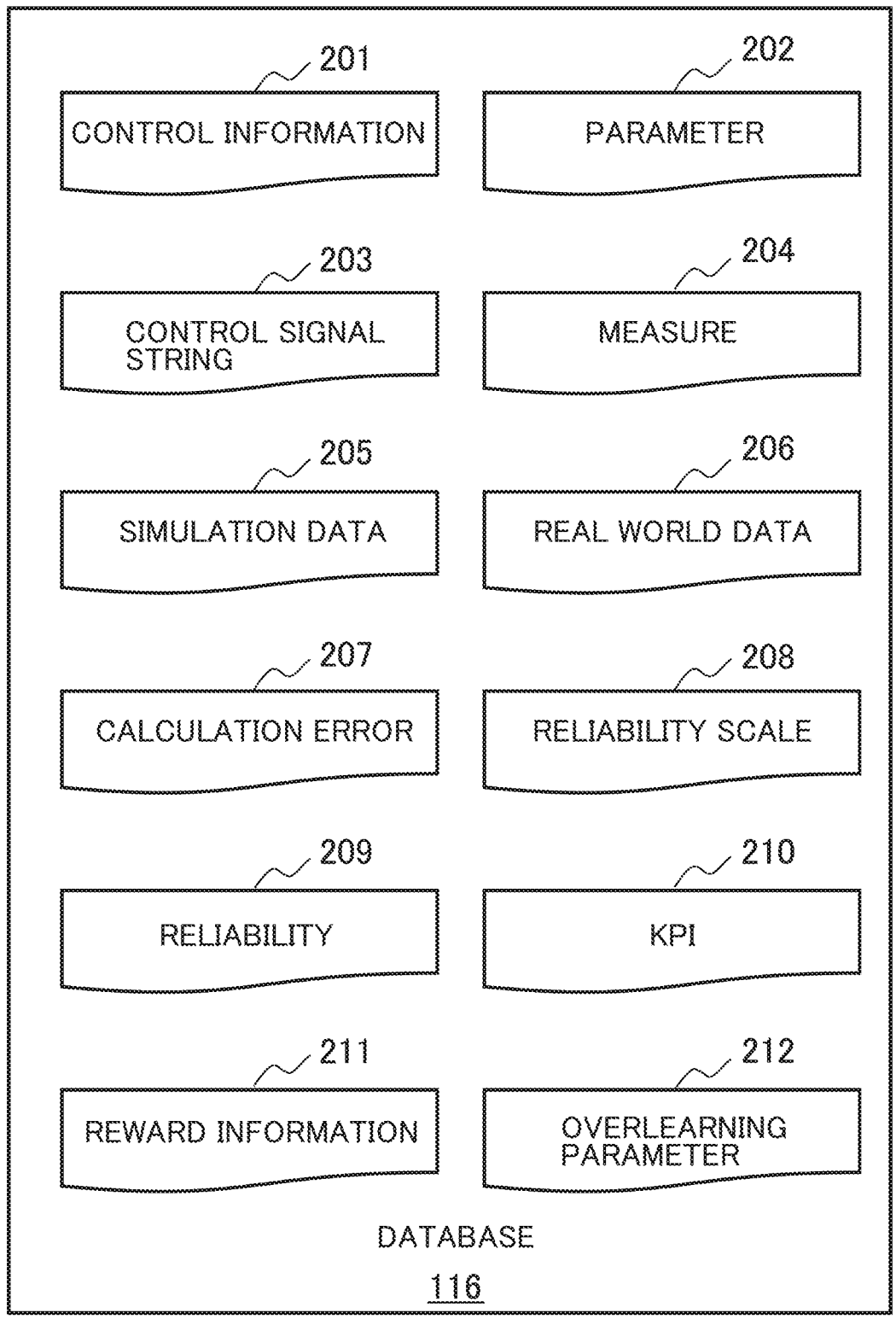
FIG. 3 is a block diagram for showing an example of data stored in a "database" 116.

FIG. 3 is a block diagram for showing an example of data stored in the "database" 116.

The "database" 116 stores "control information" 201, a "parameter" 202, a "control signal string" 203, a "measure" 204, "simulation data" 205, "real world data" 206, a "calculation error" 207, a "reliability scale" 208, "reliability" 209, a "KPI (Key Performance Indicator)" 210, "reward information" 211, and a "overlearning parameter" 212. Each of the elements 201 to 212 in the "database" 116 may be, for example, a table.

Hereinafter, an example of a method for realizing an automatic operation of the "overhead crane" 001 illustrated in FIG. 1 using the "system" 008 illustrated in FIG. 2 will be described using FIG. 1 to FIG. 3.

The configuration of the "control signal string" 203 stored in the "database" 116 is not limited to that of the "control signal string" 009 of the concrete example. For example, the configuration of the "control signal string" 203 and the configuration of the "control signal string" 009 are not limited to those illustrated in FIG. 1, and may be configured in any manner that is effective in the "overhead crane" 001. In the following description, it is assumed that the "control signal string" 009 is transmitted from the "system" 008 to the "communicable control device" 005, and the "control signal string" 009 is based on the "control signal string" 203 read from the "database" 116.

Further, an environment assumed in the simulation is not limited to automatic conveyance in a one-dimensional direction illustrated in FIG. 1, and may include, for example, automatic conveyance in two-dimensional directions, and automatic conveyance in three-dimensional directions including winding. When the conveyance is carried out in two-dimensional directions or three dimensional directions, the "swing angle θ" 007 becomes a two-dimensional amount as being known in the polar coordinate system. The control signal string may also be a control signal string corresponding to two dimensions or three dimensions, or a control signal string indicating to perform any one of "winding" and "not winding" as the "control signal string" 009 may be provided if a winding function is controlled. Information related to control targets in an environment assumed in the simulation is stored in the "control information" 201.

Elements defining the environment of the simulation may be, for example, the weight and shape of the "wagon" 002, the weight and shape of the "conveyance object" 003, and the length and shape of the "string" 004, and information indicating these elements is stored in the "control information" 201.

An example of a task aimed in the automatic operation control of the "overhead crane" 001 is to find a signal string such as the "control signal string" 009 that appropriately controls the elements (for example, the set conveyance distance and the winding length of the string) stored in the "control information" 201. In the embodiment, such a control signal string can be found using reinforcement learning. A method of generating a control signal string is not limited to the reinforcement learning.

In the "system" 008, the "CPU" 101 reads the "control signal string" 203 of the "wagon" 002 from the "database" 116, and transmits the "control signal string" 209 in accordance with the "control signal string" 203 to the "communicable control device" 005 through the "communication device" 103.

The "communicable control device" 005 controls the "wagon" 002 according to the received "control signal string" 009, and transmits to the "system" 008 real world data that is data including measurement values (for example, the speed and position of the "wagon" 002, the "swing angle θ" 007 of the "conveyance object" 003, and the length of the "string" 004) obtained from the "sensor" 006 every unit time during the control. The "CPU" 101 receives the real world data through the "communication device" 103, and stores the received real world data into the "real world data" 206 in the "database" 116 of the "data storage device" 105.

A method of generating the appropriate "control signal string" 009 necessary for controlling the above-described actual machine (the "overhead crane" 001) in the reinforcement learning will be described using a drawing.

FIG. 4 is a flowchart for showing an example of a process executed by the "reliability simulation generation module" 108. It should be noted that although data is appropriately input and output into/from the "database" 116 in the process shown by the flowchart of FIG. 4, the description related to the input and output will be omitted in some cases to avoid redundancy of the explanation.

First, the "question setting unit" 109 performs a "question setting process" S301. The "question setting process" S301 is to input the "control information" 201 and the "parameter" 202 into the "database" 116, in other words, to perform initial settings when generating a reliability simulation.

The "control information" 201 may include data input from the "input device" 106. The "control information" 201 includes information (for example, the conveyance distance and the winding length of the "string" 004) related to characteristics of the "overhead crane" 001 and characteristics of the "system" 008 controlling the "overhead crane" 001.

Further, the "control information" 201 may include information (allowable error information) indicating the range of an allowable error. The allowable error range means the range (for example, the upper limit and the lower limit of an error) of an error allowable between the actual machine and the simulation. It should be noted that the allowable error range is stored in the "control information" 201 by default, and it is not necessary for a user to designate the allowable error range. The upper limit and the lower limit of the allowable error are typically different values.

The "control information" 201 may include other kinds of information in place of or in addition to at least some of the above-described pieces of information.

The "parameter" 202 may include data input from the "input device" 106. The "parameter" 202 includes, for example, information (hereinafter, fixed error information) indicating an error (hereinafter, a fixed error) that exists in a simulator included in the "question setting unit" 109 and cannot be removed and information related to environmental settings such as an allowable region and a hyper parameter of a reward function of the reinforcement learning included in the "question setting unit" 109 and the "learning execution unit" 112.

In place of or in addition to at least some of the above-described pieces of information, the "parameter" 202 may include other kinds of information, for example, a value necessary for configuring the "system" 008.

In the embodiment, the "control information" 201 and the "parameter" 202 are different pieces of information. However, the "control information" 201 and the "parameter" 202 may be comprehensively the same information.

Figure 5:
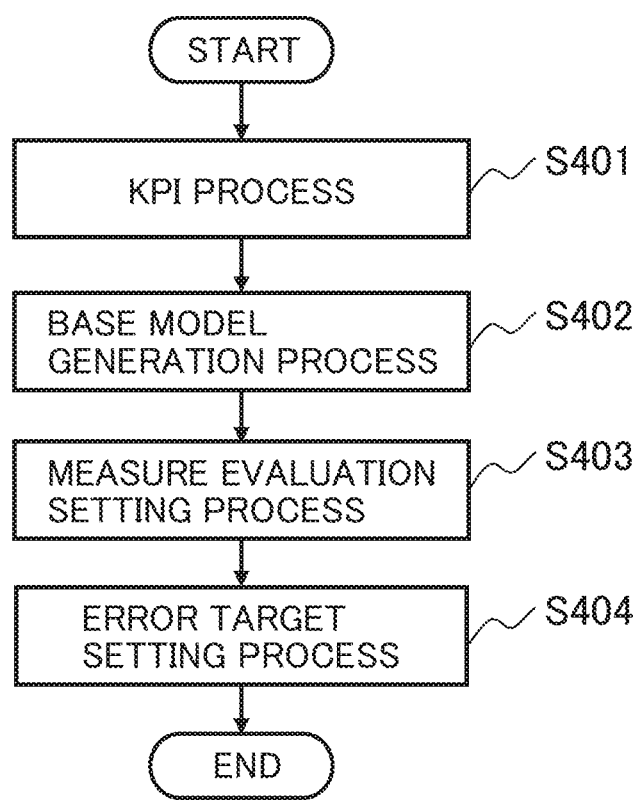
FIG. 5 is a flowchart for showing an example of details of a "question setting process" S301.

FIG. 5 is a flowchart for showing an example of details of the "question setting process" S301.

The "question setting unit" 109 executes a "KPI process" S401.

The "KPI process" S401 includes storing a KPI serving as an index value for conveyance data included in the "control information" 201 into the "KPI" 210. As an example of the KPI, an example of fast conveyance time or a small swing width of the conveyance object after completion of the conveyance can be employed for the "overhead crane" 001. However, the present invention is not limited to this example.

Next, the "question setting unit" 109 executes a "base model generation process" S402.

The "base model generation process" S402 includes modeling the "overhead crane" 001 using a mathematically-described function by inputting the "control information" 201 and the "parameter" 202, namely, generating a base model of the "overhead crane" 001.

The base model generated in the "base model generation process" S402 may be a physical model that is a deductive model of the "overhead crane" 001, for example, a model generated by a simulation using Newtonian mechanics.

The base model generated by the "base model generation process" S402 is set as a reliable model by the "question setting unit" 109, and is stored into the "simulation data" 205.

Next, the "question setting unit" 109 executes a "measure evaluation setting process" S403. The "measure evaluation setting process" S403 includes execution and evaluation of the reinforcement learning.

For example, the "measure evaluation setting process" S403 includes deciding the optimum measure at the time of using the reliable model on the basis of the KPI stored in the "KPI" 210 by using the reliable model generated in the "base model generation process" S402 as a simulator at the time of the reinforcement learning, and setting a parameter A that is the number of episodes α at which a reward converges. The parameter A is stored in the "parameter" 202 of the "database" 116 by the "question setting unit" 109, and the optimum measure is stored in the "measure" 204 of the "database" 116 by the "question setting unit" 109.

In addition, the "measure evaluation setting process" S403 relates to a reward function (a reward function defined in the reinforcement learning) stored in the "parameter" 202, and includes inputting the allowable range of an output (reward) of the reward function in order to decide the parameter A.

The parameter A may be initially input by a user and stored in the "parameter" 202 in place of being decided in the "measure evaluation setting process" S403.

The "measure evaluation setting process" S403 includes converting the decided optimum measure stored in the "measure" 204 into a control signal string suitable for the "overhead crane" 001, and storing the converted signal string into the "control signal string" 203 of the "database" 116.

In addition, the "measure evaluation setting process" S403 includes executing the control by the optimum measure on the simulation generated in the "base model generation process" S402 (inputting the stored control signal string into the base model), and storing simulation result data representing a result of the execution into the "simulation data" 205 of the "database" 116. The simulation result data includes, for example, measurement values (for example, the position and speed of the "wagon" 002 and the "swing angle θ" 007 of the "conveyance object" 003) for each unit time in the control by the optimum measure.

Next, the "question setting unit" 109 executes an "error target setting process" S404. The "error target setting process" S404 includes inputting allowable error information stored in the "control information" 201 to set an allowable error range serving as a learning completion condition on the basis of the information, and storing information indicating the set allowable error range into the "parameter" 202.

FIG. 4 will be referred to again. Next, the "reliability setting unit" 110 executes a "reliability setting process" S302.

The "reliability setting process" S302 includes presenting at least one of the control signal string (the control signal string of the optimum measure) stored in the "control signal string" 203 in the "measure evaluation setting process" S403 and the simulation result stored in the "simulation data" 205 to a user through the "output device" 107. The user selects any one of permission and denial of a learning process for the presentation through the "input device" 106, and the "reliability setting process" S302 includes inputting the selection.

In the case where the selection of denial is input in the "reliability setting process" S302, the "reliability setting unit" 110 executes an "additional process" S303. The "additional process" S303 includes accepting an input of information added to the "control information" 201 and the "parameter" 202 from the user. The input information is stored into the "control information" 201 and the "parameter" 202 in the "question setting process" S301.

In the case where the selection of permission is input in the "reliability setting process" S302, the "reliability setting unit" 110 executes, for example, the followings. Namely, the "reliability setting unit" 110 transmits the "control signal string" 009 (the control signal string of the optimum measure) according to the control signal string decided in the "measure evaluation setting process" S402 and stored in the "control signal string" 203 to the "communicable control device" 005 of the "overhead crane" 001 through the "communication device" 103. Further, the "reliability setting unit" 110 receives real world data obtained by the "sensor" 006 from the "communicable control device" 005 controlling the "overhead crane" 001 in accordance with the control signal string through the "communication device" 103, and stores the real world data into the "real world data" 206. The real world data may be a data string same as the result of the base model generated in the "base model generation process" S402, or only information that can generate the data string. Further, the real world data may include, for example, measurement values (for example, the position and speed of the "wagon" 002 and the "swing angle θ" 007 of the "conveyance object" 003) for each unit time. However, the kind of real world data is not limited to this example.

The "reliability setting process" S302 includes calculating an error by comparing the real world data obtained from the "overhead crane" 001 and stored in the "real world data" 206 with the simulation result data obtained using the reliable model (base model) generated in the "base model generation process" S402 and stored in the "simulation data" 205, and storing the error into the "calculation error" 207. The "real world data" mentioned here is actual measurement data received from the "overhead crane" 001 as a result of the control according to the "control signal string" 009 transmitted from the "system" 008, and is, for example, data including the actual measurement value (the "swing angle θ" of the "conveyance object" 003) for each unit time. The "simulation result data" is prediction data obtained as a result of executing, on the simulation, the control according to the control signal string (the signal string obtained from the "control signal string" 203) as a base of the "control signal string" 009 transmitted from the "system" 008, and is, for example, data including a measurement value predicted for each unit time.

In the case where the real world data includes one or more actual measurement values and the simulation result data includes one or more measurement values to be predicted corresponding to each of the one or more actual measurement values, one or more differential values are obtained as differential data between the real world data and the simulation result data. Each differential value is a difference (absolute value) between an actual measurement value and the measurement value to be predicted corresponding to the actual measurement value. The error may be the sum of all the differential values. As a definition of the error, another definition (for example, the average, maximum value, or minimum value of all the differential values) may be employed in place of the sum of the differential values.

The "reliability setting process" S302 includes setting reliability on the basis of the calculated error. As an example of the reliability to be set, "reliability=1" may be employed when there is no error. When there is an error, an error (for example, a fixed error of the reliable model) related to the reliable model set in the "base model generation process" S402 may be associated with "reliability=0.

The "reliability setting process" S302 includes inputting the error stored in the "calculation error" 207 to calculate a reliability scale (the scale of reliability) using the error, and storing the calculated reliability scale into the "reliability scale" 208 of the "database" 116. The reliability scale means a relation between reliability and an error. For example, "reliability=0" corresponds to the calculated error, "reliability=1" corresponds to "error=0", and reliability that is larger than 0 and smaller than 1 and an error corresponding to the reliability may be mutually converted to each other on the basis of the correspondence relation.

In addition, the "reliability setting process" S302 includes inputting fixed error information stored in the "parameter" 202 to set initial reliability $T_0$ on the basis of the fixed error information. It should be noted that the initial reliability may be stored into the "parameter" 202 as a hyper parameter, or may be stored into the "control information" 201.

The "reliability setting process" S302 includes storing the set initial reliability $T_0$ into the "reliability" 209.

An example of the initial reliability $T_0$ includes a value larger than the reliability (for example, 0) with which the fixed error is associated, or 0.1 simply corresponding to 10% of reliability. However, the initial reliability $T_0$ is not limited to this example.

Reliability $\tau$ is an amount estimated on the basis of an error. Namely, the reliability $\tau$ is an amount equivalent to an error depending on the standard of an error. Therefore, the reliability $\tau$ can be regarded as an error. In the embodiment, $0 \leq \tau \leq 1$ is satisfied.

As similar to the "base model generation process" S402, the "reliability setting process" S302 includes setting the reliable model as a base model, and storing the base model into the "simulation data" 205 of the "database" 116.

Next, the "applied model generation unit" 111 executes an "applied model generation process" S304 and an "applied model weight calculation process" S305.

The "applied model generation process" S304 includes inputting the base model stored in the "simulation data" 205, the error stored in the "calculation error" 207, and the allowable error range stored in the "parameter" 202, and adjusting the error using a mathematically-described function.

When the adjustment used in the "applied model generation process" S304 is performed so as to eliminate an error, an overlearned model is generated. Thus, all of data are adjusted with a polynomial function so as to fall within the allowable error range.

Figure 6:
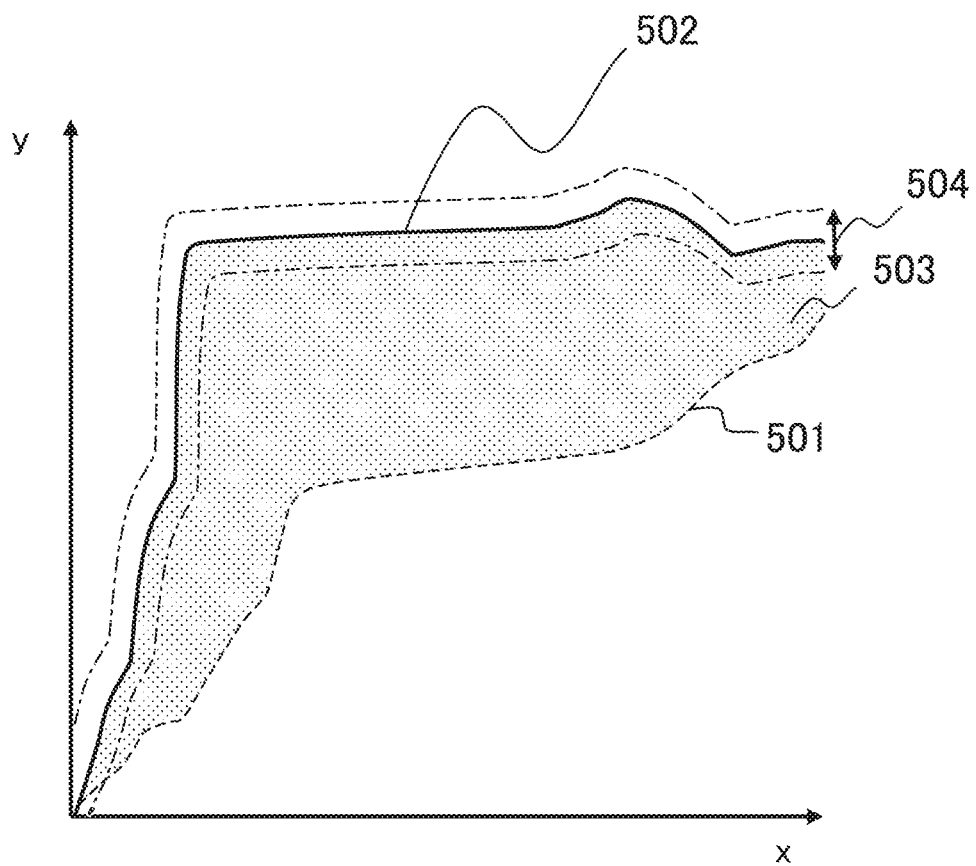
FIG. 6 is an area diagram for showing an example of an adjustment of machine learning.

FIG. 6 shows an example of an adjustment of machine learning. The horizontal axis corresponds to time, and the vertical axis corresponds to a kind of measurement value (for example, a conveyance distance).

With reference to FIG. 6, an adjustment area is an area 503 between a dotted line 501 that can be reproduced by the base model and a solid line 502 shown by the real world data. In addition, a range 504 showing an area between two alternate long and short dash lines is an example of the allowable error range. Thus, an adjustment function to be decided is one that embeds an error into the inside of the range where the area 503 and the allowable error range 504 are overlapped with each other.

As an example of the above-described adjustment function (adjustment model), the polynominal function is exemplified. However, the present invention is not limited to the polynominal function or the machine learning, and may include a regression model obtained from data. Examples of the adjustment function include the spline interpolation, Taylor expansion, nearest neighbor algorithm, support vector machine, and random forest, but the present invention is not limited to these examples.

The "applied model generation process" S304 includes storing the adjustment model into the "simulation data" 205 of the "database" 116.

In the "applied model weight calculation process" S305, the reliability τ stored in the "reliability" 209, the adjustment model stored in the "simulation data" 205, and the reliability $T_1$ stored in the "parameter" 202 are input.

The "applied model weight calculation process" S305 includes generating an adjustment model (hereinafter, an adjustment model having a weight of $\tau_1$) having a weight (ratio) of $\tau_1$ among those generated in the "applied model generation process" S304, and storing the adjustment model having a weight of $\tau_1$ into the "simulation data" 205. It should be noted that $\tau_1$ is larger than 0 and is smaller than τ (reliability). The reason that $\tau_1$ is smaller than τ is to avoid an increased ratio of applying an adjustment model with the possibility of overlearning when an error is large (when τ is small).

Figure 7:
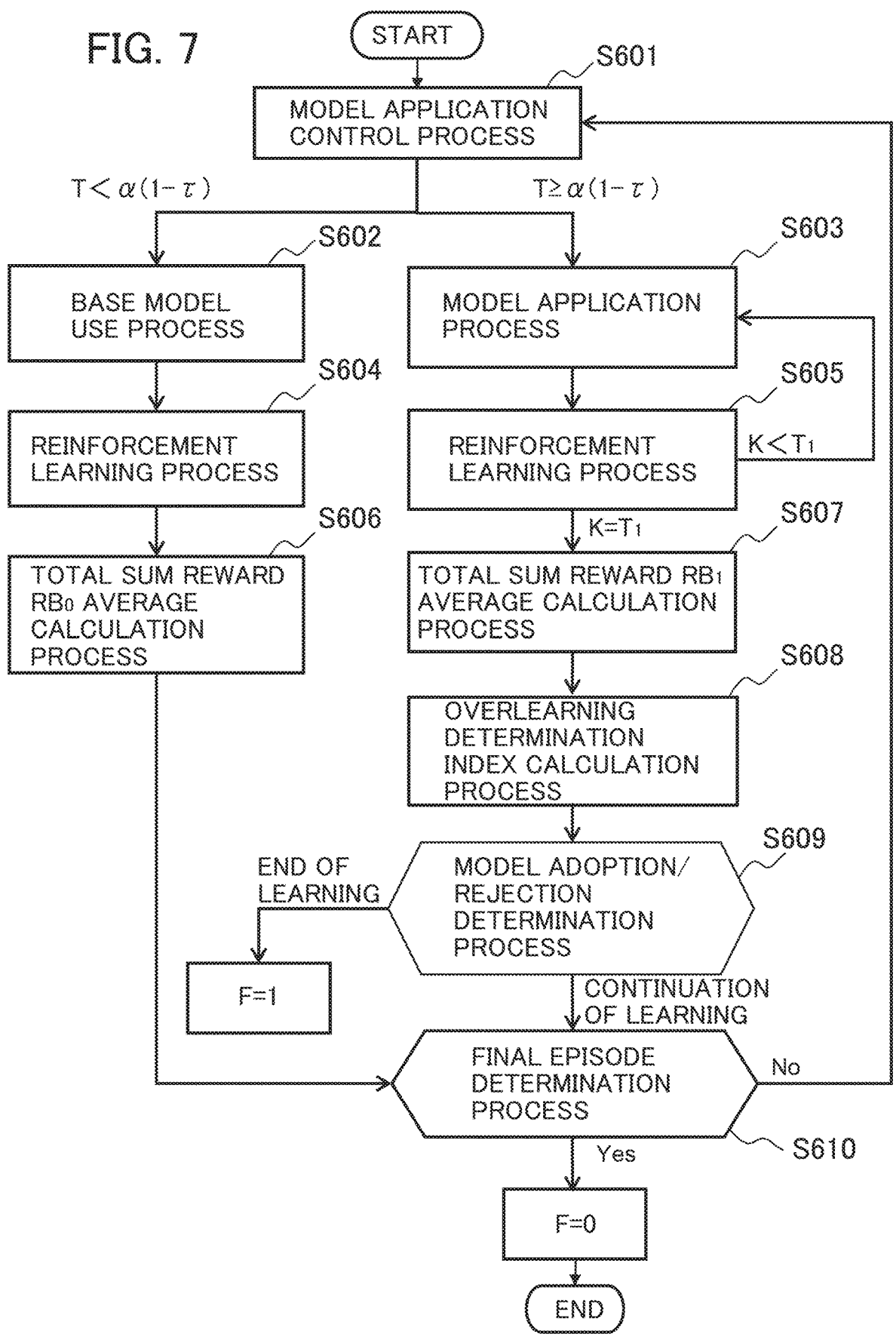
FIG. 7 is a flowchart for showing an example of details of a "learning execution process" S306.

Next, the "learning execution unit" 112 executes a process of a "learning execution process" S306. FIG. 7 shows details of the "learning execution process" S306.

With reference to FIG. 7, the "learning execution unit" 112 executes a "model application control process" S601 first.

The "model application control process" S601 includes inputting the "simulation data" 205 and counting episodes of the reinforcement learning. The count value T (the number of episodes T) is incremented every time S601 is executed. Further, the "model application control process" S601 includes outputting only the base model or the base model and the adjustment model having a weight of $\tau_1$ in accordance with the number of episodes T.

Figure 8:
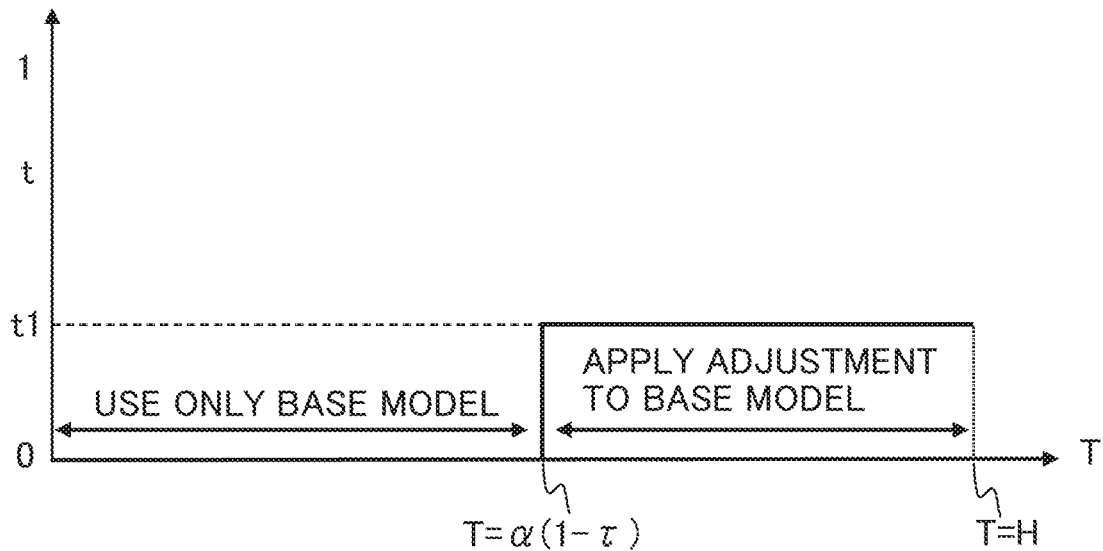
FIG. 8 is a schematic diagram for showing an example of adjustment application.

Specifically, for example, the "model application control process" S601 includes comparing the number of episodes T with α(1−τ) (α is smaller than the final number of episodes H). The "model application control process" S601 includes outputting only the base model in the case where T is smaller than α (1−τ). As a result, the "base model use process" S602 is executed. On the other hand, the "model application control process" S601 includes outputting the base model and the adjustment model having a weight of $\tau_1$ in the case where T is equal to or larger than α (1−τ). As a result, the "model application process" S603 is executed. FIG. 8 shows the above-described example in this paragraph. With the above-described configuration, an adjustment simulation can be applied on the basis of the reliability τ. Accordingly, it is possible to learn at an early stage with the adjustment model (the adjustment model whose reliability τ is high) having a low influence of overlearning. In addition, with the above-described configuration, when the reliability τ is low, a search in a "reinforcement learning process" S605 to be described later is restricted in a search method such as ε-greedy. Therefore, as will be described later, it is possible to identify fluctuations in the reward function due to the influence of overlearning without performing a search with a simulation including the influence of overlearning. It should be noted that an example of the meaning of comparing T with α (1−τ) is as follows. Namely, in the case where T is larger than the convergence number of episodes α and is smaller than the final number of episodes H, it is conceivable that the reinforcement learning has been sufficiently performed, and thus it is conceivable that even if the learning is continued by increasing the number of episodes, the result is not changed much. Therefore, when α (1−τ) <T<α is satisfied, it can be expected that the learning is performed a little although the learning ratio is low. In such a situation, it can be expected not to overlearn the situation of overlearning by applying the adjustment model. Such an applying method of the adjustment model is an example, and another applying method (for example, a method of comparing the number of episodes T with another value) may be employed other than the applying method on the basis of the comparison result between the number of episodes T and α (1−τ).

In the case where T is smaller than α (1−τ), the "learning execution unit" 112 executes the "base model use process" S602, a "reinforcement learning process" S604, and a "total sum reward $RB_0$ average calculation process" S606.

In the "base model use process" S602, the base model output in the "model application control process" S601 is input.

The "reinforcement learning process" S604 includes inputting the base model and the number of episodes, and executing the learning.

Specifically, for example, the "reinforcement learning process" S604 includes performing a search in the reinforcement learning using the base model, inputting the KPI stored in the "KPI" 210, and generating a reward function necessary for evaluation of learning.

The "reinforcement learning process" S604 includes inputting the convergence number of episodes α (the convergence number of episodes α stored in the "parameter" 202) set in the "measure evaluation setting process" S403 and the number of episodes T of the "model application control process" S601, and controlling the search in accordance with the number of episodes T.

As an example of a control method of the search, ε-greedy in which a search probability decreases as the number of episodes increases is exemplified, but another method may be employed.

The "reinforcement learning process" S604 includes calculating the total sum of rewards (the total sum reward $RB_0$) obtained in the current episode learning, and storing the current total sum reward $RB_0$ into the "reward information" 211.

The "total sum reward $RB_0$ average calculation process" S606 includes inputting the total sum reward $RB_0$ so far stored in the "reward information" 211 and the number of episodes $T_1$ (for example, the number of episodes preliminarily designated or designated by a user) stored in the "parameter" 202 to calculate the average of the total sum reward $RB_0$ (namely, the total of the total sum reward $RB_0$ so far is divided by the number of episodes $T_1$), and storing the average of the total sum reward $RB_0$ into the "reward information" 211 of the "database" 116. A method of taking the average of the total sum reward $RB_0$ is not limited, and the average may be taken by using $T_1$ as a batch, or the average may be taken using $T_1$ by obtaining one episode every two episodes.

In the case where the number of episodes T is equal to or larger than α (1−τ), the "learning execution unit" 112 executes the "model application process" S603, the "reinforcement learning process" S605, a "total sum reward $RB_1$ average calculation process" S607, an "overlearning determination index calculation process" S608, and a "model adoption/rejection determination process" S609.

In the "model application process" S603, the number of episodes T at this time (namely, the number of episodes when the adjustment model is applied for the first time) is stored into the "parameter" 202 as $T_{in}$.

In the "model application process" S603, the number of episodes $T_{in}$ and the simulation (the base model and the adjustment model having a weight of $\tau_1$) stored in the "simulation data" 205 are input, and the adjustment model having a weight of $\tau_1$ is applied to the base model in accordance with the number of episodes $T_{in}$. The magnitude of the application (a ratio at which the adjustment model is applied) may be the same as a fixed value $\tau_1$ from the start of the application, or $\tau_1$ may be added every one episode. Although the magnitude of the application is herein exemplified as described above, the present invention is not limited to this example.

Further, in the case where the fixed value $\tau_1$ is maintained as the magnitude of the application from the start of the application, if the "learning execution unit" 112 has already applied the adjustment model having a weight of $\tau_1$ to the base model in the "model application process" S603, the adjustment model is not newly applied to the base model in the next "model application process" S603.

However, the "learning execution unit" 112 maintains the sum of the weight $\tau_1$ and the reliability $\tau$ so as not to exceed 1 in the "model application process" S603. The sum is maintained to prevent the value of a model (hereinafter, an update base model) as a result of applying the adjustment model having a weight of $\tau_1$ to the base model from exceeding the value of the simulation deriving with the adjustment.

The "reinforcement learning process" S605 includes inputting the update base model and the number of episodes $T_1$, and executing the learning.

Specifically, for example, the "reinforcement learning process" S605 includes performing a search in the reinforcement learning using the update base model, inputting the KPI stored in the "KPI" 210, and generating a reward function necessary for evaluation of learning.

In the "reinforcement learning process" S605, the convergence number of episodes $\alpha$ (the convergence number of episodes $\alpha$ stored in the "parameter" 202) set in the "measure evaluation setting process" S403 and the number of episodes T of the "model application control process" S601 are input to control the search in accordance with the number of episodes T.

As an example of a control method of the search, $\varepsilon$-greedy in which a search probability decreases as the number of episodes increases is exemplified, but another method may be employed.

The "reinforcement learning process" S605 includes calculating the total sum of rewards (the total sum reward $RB_1$) obtained in the current episode learning, and storing the current total sum reward $RB_1$ into the "reward information" 211.

The "model application process" S603 and the "reinforcement learning process" S605 are repeated until the number of times of learnings K of the "reinforcement learning process" S605 becomes $T_1$. In the case where the number of times of learnings K of the "reinforcement learning process" S605 becomes $T_1$, the "total sum reward $RB_1$ average calculation process" S607 is executed.

The "total sum reward $RB_1$ average calculation process" S607 includes calculating the average of the total sum reward $RB_1$ on the basis of the total sum reward $RB_1$ so far stored in the "reward information" 211 and $T_1$.

The "overlearning determination index calculation process" S608 includes deciding an overlearning determination index that is an index (condition) meaning that the adjustment model has overlearned (a model overlearned by the adjustment model). The overlearning determination index may include, for example, at least one of the following (A) to (D).

(A) The average of the total sum reward $RB_1$ stored in the "reward information" 211 after the "model application process" S603 is larger than that of the total sum reward $RB_0$ calculated last in S606.

(B) The reward function fluctuates more than the number of times estimated by the probability of search. It should be noted that an example of the meaning of the index (B) is as follows. Even in the case where the learning has been advanced to a certain degree, a search is performed (new action is taken without using the knowledge (the result of the learning) so far) in the reinforcement learning in some cases. Thus, when the search fails, the reward largely fluctuates in some cases. The fluctuations in the reward more than the number of times expected on the basis of the probability that the search occurs are caused by a situation where the simulation (model) using the learning has overlearned. Therefore, the index (B) can be an example of the overlearning determination index.

(C) The range of the increased/decreased total sum reward is larger than that before the application of the adjustment model having a weight of $\tau_1$. A concrete example of the index (C) is as follows. A difference between the reward when the number of episodes T (T>$\alpha$ (1–$\tau$)=4000) is 5000 and the reward when the number of episodes T is 5001 is larger than that between the reward when T=10 and the reward when T=11 before the application of the adjustment model (T<4000) (for example, it is assumed that the difference in the reward was the largest before the application of the adjustment model).

(D) The reward fluctuation range $DRB_1$ (the range between the maximum value and the minimum value of the total sum reward $RB_1$) of the update base model exceeds the reward fluctuation range $DRB_0$ (the range between the maximum value and the minimum value of the total sum reward $RB_0$) when using the base model immediately before the application. For example, at least one of the followings corresponds to the index (D): the maximum value of the reward fluctuation range $DRB_1$ exceeds that of the reward fluctuation range $DRB_0$; the minimum value of the reward fluctuation range $DRB_1$ is below that of the reward fluctuation range $DRB_0$; and the reward fluctuation range $DRB_1$ is larger than the reward fluctuation range $DRB_0$. The reward fluctuation range $DRB_0$ and the reward fluctuation range $DRB_1$ are stored in the "reward information" 211. A concrete example of the index (D) is as follows. A difference between the maximum value and the minimum value (for example, the maximum reward when T=10 and the minimum reward when T=1930) of the rewards obtained before T=4000 is used as the reward fluctuation range $DRB_0$, a difference between the maximum value and the minimum value (for example, the minimum reward when T=5001 and the maximum reward when T=6000) of the rewards obtained after the application of the model is used as the reward fluctuation range $DRB_1$, and $DRB_0$ and $DRB_1$ are compared with each other.

In addition, in the case where the overlearning determination index is satisfied, the "overlearning determination index calculation process" S608 includes determining the adjustment model as an overlearned model.

In the case where it is determined that the adjustment model has overlearned in the "overlearning determination index calculation process" S608, the "model adoption/rejection determination process" S609 includes setting F (F is an overlearning determination parameter) to 1 and storing F=1 into the "overlearning parameter" 212 of the database 109. In addition, the "CPU" 101 (for example, the "learning execution unit" 112) may present F=1 to a user through the "output device" 107 in this case. F is set to 0 when the adjustment model has not overlearned, and F is set to 1 when the adjustment model has overlearned. According to FIG. 4, when F=1, the "applied model generation process" S304 is executed again.

In the case where there is no determination on overlearning in the "model adoption/rejection determination process" S609, or after the "total sum reward $RB_0$ average calculation process" S606, the "learning execution unit" 112 executes the "final episode determination process" S611.

When the number of episodes is equal to or larger than the final number of episodes H stored in the "parameter" 202, the "final episode determination process" S611 includes terminating the reinforcement learning, setting F to 0 at the time, and storing F=0 into the "overlearning parameter" 212 of the "database" 116.

In the case where the number of episodes has not reached the final number of episodes H in the "final episode determination" S611, the "model application control process" S601 is executed. As being apparent from the above description, according to FIG. 7, when the number of episodes T is equal to or larger than $\alpha$ $(1-\tau)$, S603 is performed. In this case, the processes subsequent to S607 are performed for each number of episodes $T_1$ (for example, for 10 episodes). The learning is finished through S609 depending on the overlearning determination index at the time.

Figure 9:
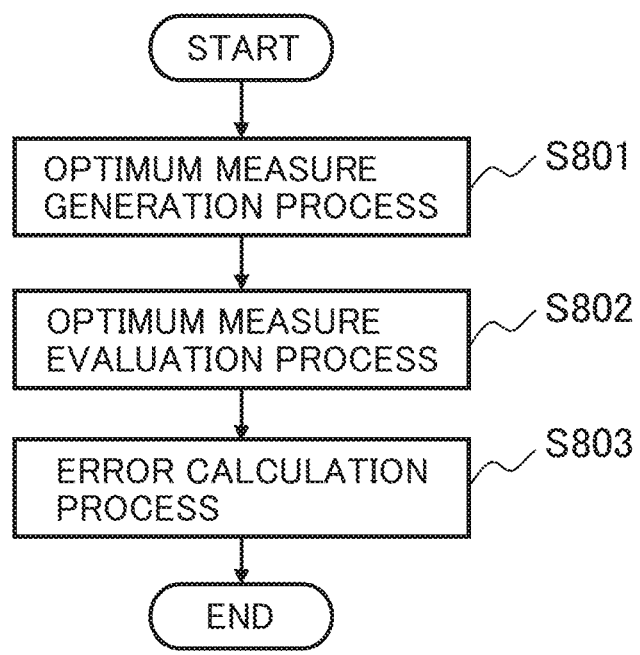
FIG. 9 is a flowchart for showing an example of details of an "evaluation process" S307.

According to FIG. 4, in the case where F=0 is output, the "evaluation unit" 113 executes an "evaluation process" S307. FIG. 9 shows details of the "evaluation process" S307.

With reference to FIG. 9, the "evaluation unit" 113 executes an "optimum measure generation process" S801.

The "optimum measure generation process" S801 includes deciding a measure that most satisfies the KPI stored in the "KPI" 210 from the number of episodes $T_{in}$ stored in the "parameter" 202 until the end of the learning as the optimum measure, and storing the measure into the "measure" 204 of the "database" 116.

In addition, the "optimum measure generation process" S801 includes generating a control signal string on the basis of the optimum measure, and storing the generated control signal string into the "control signal string" 203 of the "database" 116.

In addition, the "optimum measure generation process" S801 includes storing simulation result data (for example, data including a measurement value to be anticipated such as a conveyance distance) using the generated control signal string and a model (a model as a simulation into which the control signal string is input) into the "simulation data" 205 of the "database" 116.

In addition, the "optimum measure generation process" S801 includes presenting information indicating at least one of the simulation result stored in the "simulation data" 205, the reliability $\tau$ stored in the "reliability" 209, the ratio (weight) $\tau_1$' of the adjustment model, and the reward fluctuation stored in the "reward information" 211 to a user through the "output device" 107, and accepting from the user_whether actual operation confirmation in the "overhead crane" 001 (actual machine) is permitted or refused.

In the case where an input of refusal is received from the user through the "input device" 106, the "CPU" 101 executes the "learning execution process" S306 again according to FIG. 4. It should be noted that $\tau_1$' is stored in the "reliability" 209. $\tau_1$' may be equivalent to $\tau_1$, or in the case where $\tau_1$ is added in accordance with the number of episodes, the sum thereof may be employed. However, it is assumed that $\tau_1$' is smaller than $\tau_1$. It should be noted that "the number of episodes" mentioned herein is n in the case where, for example, $\tau_1$ is added every n episodes (n is a natural number).

In the case where an input of permission is received from the user through the "input device" 106, the "evaluation unit" 113 executes an "optimum measure evaluation process" S802 next with reference to FIG. 9.

The "optimum measure evaluation process" S802 includes inputting the control signal string stored in the "control signal string" 203 in the "optimum measure generation process" S801, and transmitting the "control signal string" 009 on the basis of the signal string to the "communicable control device" 005 of the "overhead crane" 001 through the "communication device" 103.

The "optimum measure evaluation process" S802 includes receiving real world data including the measurement value obtained from the "sensor" 006 of the "overhead crane" 001 controlled in accordance with the "control signal string" 009 through the "communication device" 103, and storing the real world data into the "real world data" 206 of the "database" 116. The real world data stored in the "real world data" 206 may be real world data having the same configuration as the simulation result data stored in the "simulation data" 205, or may be only information with which the received real world data can be generated. The real world data may be the position, speed, or the like of the "wagon" 002, but the present invention is not limited to this example.

Next, the "evaluation unit" 113 executes an "error calculation process" S803.

The "error calculation process" S803 includes inputting the simulation result data stored in the "simulation data" 205 in the "optimum measure generation process" S801 and the real world data stored in the "real world data" 206, deriving an error by comparing the simulation result data with the real world data, and storing the error into the "calculation error" 207.

FIG. 4 will be referred to again. Next, the "reliability generation unit" 114 executes the "reliability generation process" S308.

The "reliability generation process" S308 inputs an error and a reliability scale from the "calculation error" 207 and the "reliability scale" 208, respectively, generates reliability i' corresponding to the input error on the basis of the reliability scale, and stores the generated reliability $\tau$' into the "reliability" 209.

Next, the "reliability generation unit" 114 executes an "error confirmation process" S309.

The "error confirmation process" S309 includes inputting allowable error information (information indicating an allowable error range) stored in the "parameter" 202, and presenting information indicating at least one of the comparison result between the simulation and the actual machine, the error, the reliability, and completion of the trial to the user through the "output device" 107 if the calculated error falls within the allowable error range. If the error is smaller than the allowable error, the "CPU" 101 may stop the operation of the "reliability simulation generation module" 108.

On the other hand, in the case where the error is out of the allowable error range, the "evaluation unit" 113 executes a "reliability evaluation process" S310.

The "reliability evaluation process" S310 includes setting $\tau$' as new reliability $\tau$ when $\tau'>\tau$, storing the new reliability $\tau$ into the "reliability" 209 of the "database" 116, and moving to a "reliability/base model update process" S311.

On the other hand, the "reliability evaluation process" S310 includes outputting $\tau' \leq \tau$ through the "output device" 107 when $\tau' \leq \tau$, and moving to the "reliability setting process" S302 without moving to the "reliability/base model update process" S311.

The "reliability/base model update process" S311 is executed by the "reliability/base model update unit" 115.

The "reliability/base model update process" S311 inputs the reliability $\tau(\tau')$ stored in the "reliability" 209 and the base model (for example, the base model to which the adjustment model has been applied) stored in the "simulation data" 205, generates a simulation (namely, a new base model) by adding the adjustment model to the base model by only a ratio of the reliability $\tau$, and updates the simulation as the base model.

It should be noted that the ratio at which the adjustment model is added when updating the base model in the "reliability/base model update process" S311 is not necessarily one obtained by multiplying the reliability $\tau$, but may be the square of $\tau$ or $1-\tau$ without limiting to the above-described example. It should be noted that the ratio of the adjustment is set to be not larger than the reliability scale.

The "reliability/base model update process" S311 includes storing the base model into the "simulation data" 205.

Next, the "CPU" 101 moves to the "applied model weight calculation process" S305. The flow of FIG. 4 continues until the error between the simulation and the real world falls within the allowable error range stored in the "parameter" 202.

According to the embodiment, it is possible to generate a simulation in which the influence of an adjustment of machine learning including overlearning is eliminated, and automatic operation control can be realized by using the simulation in the reinforcement learning. Specifically, in the embodiment, the "operation control unit" 118 controls the automatic operation of the "overhead crane" 001 by transmitting the optimum. "control signal string" 009 found on the basis of the generated simulation to the "overhead crane" 001.

Further, according to the embodiment, at least one of the reliability stored in the "reliability" 209, the error between the simulation and the actual machine, selection of whether to permit or refuse an experiment in the actual machine, and the reward fluctuation range is presented to the user.

Second Embodiment

A second embodiment will be described. At this time, different points between the first embodiment and the second embodiment will be mainly described, and common points therebetween will be omitted or simplified.

The present invention can be applied to not only the "overhead crane" 001 but also machines in general (for example, industrial machines in general such as large-size industrial machines) that can calculate an error between the real world and a simulation. The application range of the present invention does not depend on whether or not feedback control is performed, or whether or not control is using binaries, discrete values, or continuous values.

The second embodiment is a concrete example in which machines other than the "overhead crane" 001 are subject to automatic operation control. Hereinafter, a concrete example of a large-size industrial machine capable of simply performing feedback control will be described using the contents described in the first embodiment.

Figure 10:
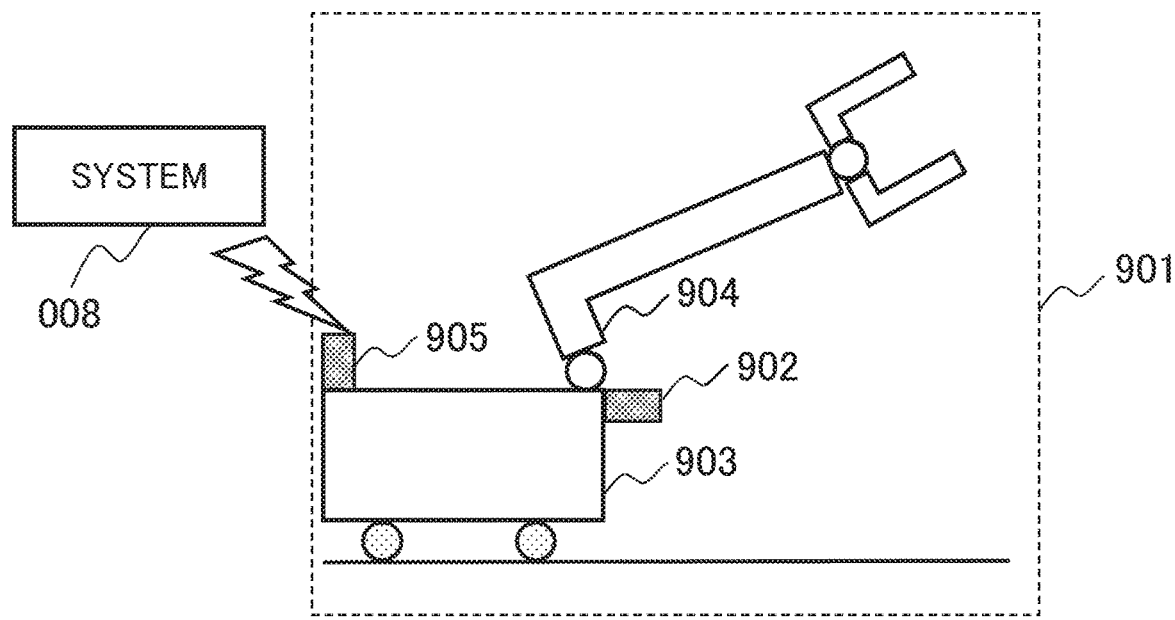
FIG. 10 is a schematic diagram for showing an example of a configuration of an "arm wagon" 901.

For example, as a large-size industrial machine, an "arm wagon" 901 as shown in FIG. 10 will be considered.

The "arm wagon" 901 has a "sensor" 902 such as a camera. The "sensor" 902 can obtain an actual measurement value related to the "arm wagon" 901.

Further, it is assumed that a simulation of the "arm wagon" 901 can be generated.

The "arm wagon" 901 has a "wagon" 903, an "arm" 904 mounted to the "wagon" 903, and a "communication-controllable control device" 905, and can grab an object with the "arm" 904 by control. The real world data of the "arm wagon" 901 is transmitted from the "communication-controllable control device" 905. The real world data of the "arm wagon" 901 may include, for example, the position and speed of the "wagon" and the position of the "arm" 904. However, the present invention is not limited to this, and information such as surrounding environmental temperatures may be included.

The speed and position of the "wagon" 903 are controlled by the "communication-controllable control device" 905. The speed control may be binary control of acceleration and deceleration, or control (for example, control designating a predetermined value among continuous values as the value of the speed) using continuous values (values at predetermined intervals). However, FIG. 10 shows an example of control using continuous values.

The speed and position of the "arm" 904 may be controlled by the "communication-controllable control device" 905 in accordance with the control using continuous values. However, it is herein assumed that the control of the "arm" 904 is "to lower", "to rise", or "to grab an object", and an area where the "arm" 904 moves is one axial direction.

The "arm" 904 may be controlled so that the area where the "arm" 904 moves is up to three axial directions such as "the arm stretches", "the arm rotates", and "the arm moves on a planar place". However, one axial direction is considered in this case for the sake of simplicity.

The "communication-controllable control device" 905 has characteristics similar to those of the "communicable control device" 005 provided in the "overhead crane" 001, and it is not necessary to be mounted to the "wagon" 903 of the "arm wagon" 901.

Figure 11:
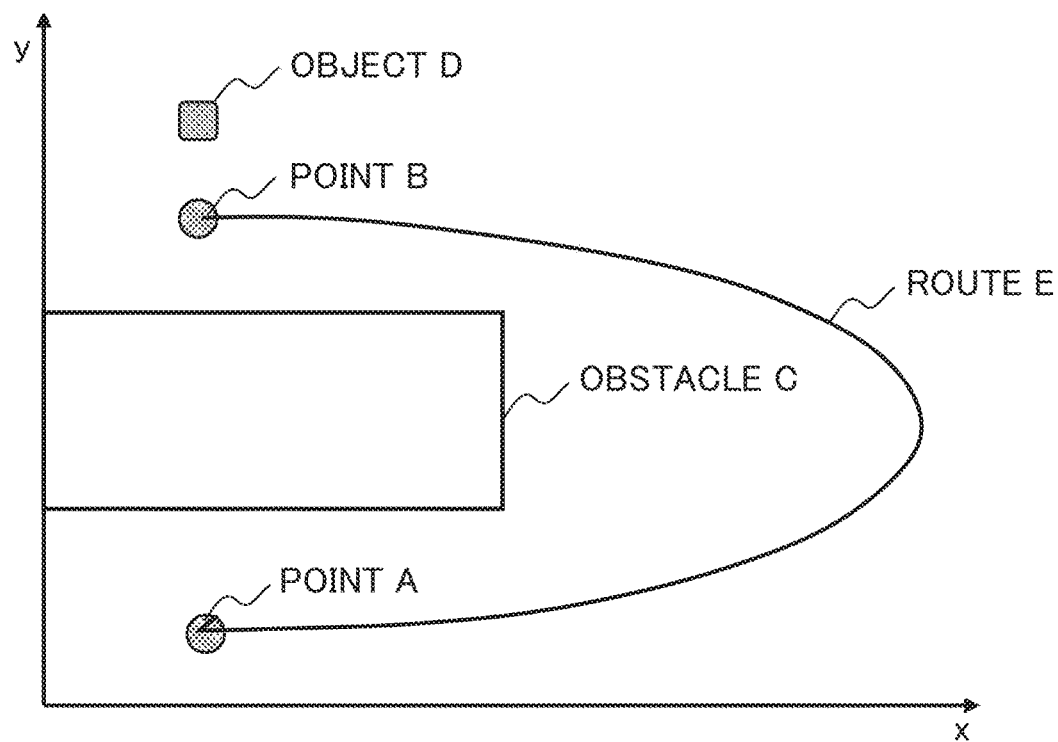
FIG. 11 is a schematic diagram for showing an example of a process of the "arm wagon" 901.

An example considered herein is the example shown in FIG. 11, namely, a process in which the "arm wagon" 901 starts from a point A, reaches a point B through a route E avoiding an obstacle C to grab an object D with the "arm" 904, and returns to the point A through the route E in a state where the object D is grabbed.

The process diagram of FIG. 11 is illustrated in a two-dimensional plane for the sake of simplicity.

The "reliability simulation generation module" 108 learns the above-described process by the reinforcement learning using a simulation, and the same process is executed for the "arm wagon" 901. The control signal string, the simulation result data, and the real world data include values indicating, for example, the positions of the "wagon" 903 and the "arm" 904, the speed of the wagon, and the state (for example, "to raise", "to lower", or "to grab an object") every unit time.

Here, the "arm wagon" 901 may be capable of performing feedback control, and a case of feedback control different from the example of the "overhead crane" 001 will be herein considered.

The "reliability simulation generation module" 108 stores the optimum measure searched in the reinforcement learning into the "measure" 204, presents the simulation result data using the measure to a user, and transmits the control signal string to the "communication-controllable control device"

905 of the "arm wagon" 901 through the "communication device" 103 after obtaining permission of the user.

The "arm wagon" 901 performs control in accordance with the control signal string received by the "communication-controllable control device" 905, and transmits the real world data including the measurement values every unit time to the "system" 008. The "reliability simulation generation module" 108 stores the real world data from the "arm wagon" 901 into the "real world data" 206 of the "database" 116.

In the case where the simulation result data is different from the real world data, the "reliability simulation generation module" 108 calculates an error by comparing the simulation result data with the real world data, stores the calculated error into the "calculation error" 207, derives reliability on the basis of the error, and stores the derived reliability into the "reliability" 209.

Next, the "reliability simulation generation module" 108 generates an adjustment model adjusting an error, applies the adjustment model to a reliable base model, removes the influence of overlearning of the adjustment model in the process of the reinforcement learning, derives the optimum measure, and stores the derived optimum measure into the "measure" 204.

Next, the "reliability simulation generation module" 108 allows the "arm wagon" 901 to actually execute the process exemplified in FIG. 11 on the basis of the optimum measure, receives real world data including the measurement value measured in the process through the "communication device" 103, and stores the real world data into the "real world data" 206 of the "database" 116.

Next, the "reliability simulation generation module" 108 calculates an error by comparing the stored real world data with the simulation result data of the control of the "arm wagon" 901, stores the calculated error into the "calculation error" 207, derives reliability on the basis of the error, and stores the derived reliability into the "reliability" 209.

Next, in the case where the reliability has been increased, the "reliability simulation generation module" 108 updates the base model including the adjustment model, setting the updated base model as a reliable model, and stores the reliable model into the "simulation data" 206.

On the other hand, in the case where the reliability has been decreased, the "reliability simulation generation module" 108 generates the adjustment model again.

As described above, even if the "arm wagon" 901 is subject to automatic operation control, a reliable simulation can be generated.

For example, the above description of the first and second embodiments can be summarized as follows. It should be noted that the following summary may include matters that are not mentioned in the above description.

An automatic operation control system (for example, the "system" 008) of a machine (for example, the "overhead crane" 001 or the "arm wagon" 901) includes a question setting unit and a learning execution unit. The question setting unit sets a first model (for example, the base model) showing a relation between a control signal string input to the machine on the basis of a mathematically-described function and data output from the machine controlled in accordance with the control signal string. The learning execution unit executes a learning process including to learn automatic operation control of the machine. The learning execution unit executes learning using the first model until a first condition (for example, $T \geq \alpha (1-\tau)$) is satisfied in the learning process. After the first condition is satisfied, the learning execution unit executes learning using a second model (for example, the update base model) that is a model after the first model is changed one or more times until a second condition (for example, the overlearning determination index) meaning overlearning is satisfied or the learning is finished without satisfying the second condition.

Accordingly, an error between the actual machine and a simulation can be reduced by removing the influence of the overlearning of an adjustment by the mathematically-described function, and thus the automatic operation control of the machine can be optimized. Specifically, for example, it is possible to eliminate a situation in which a reward fluctuates violently due to a change in the environment of the simulation optimizing the automatic operation control of the machine by reducing the error between the actual machine and the simulation. In the case where the reward has fluctuated violently, it can be understood that the model of the adjusted machine learning has overlearned, and thus it is possible to remove the influence of the overlearning by generating an adjustment model by which the reward does not fluctuate violently and to reduce the error between the simulation and the actual machine.

It should be noted that the automatic operation control system (hereinafter, a system) may be one or more computers including an interface device, a storage device, and a processor, or a system realized on a computation resource pool (one or more computers) such as a cloud base.

The system may include an operation control unit. The operation control unit may control the automatic operation of the machine by inputting a control signal string in accordance with the result of the learning process into the machine.

The second model may be a model as a result of applying to the first model a predetermined ratio of a mathematically-described third model (for example, the adjustment model) that is different from the first model. Accordingly, even if the third model is an overlearned model, the influence of the overlearning can be reduced according to the application ratio.

The system may include a reliability setting unit. The reliability setting unit may calculate first reliability (for example, $\tau$) on the basis of a first error between first simulation result data output from the first model into which a first control signal string has been input and real world data output from the machine into which the first control signal string has been input. The ratio of the third model to be applied may be a ratio smaller than the first reliability. Accordingly, it can be expected to appropriately set the ratio of the third model. For example, in order to find the optimum conveyance control signal string in the automatic operation control of the machine such as the "overhead crane" 001, the reliability setting unit adjusts the adjustment model for machine learning to the base model such as a physical model by a weight of $\tau_1$ smaller than the reliability $\tau$ in a simulation used for reinforcement learning.

The first condition may be a condition based on the first reliability and the number of times of learning (for example, the number of episodes T). Accordingly, it can be expected to appropriately set the timing at which the second model is used.

The system may include an applied model generation unit. The applied model generation unit may generate the third model to which the first model is adjusted so that the first error falls within an allowable error range.

In the case where the second condition is satisfied, the learning execution unit may finish the learning process.

The reliability setting unit may display at least one of the first error and the first reliability. For example, the reliability setting unit may display UI information having at least one of the first error and the first reliability and a UI (User Interface) accepting permission of the learning process. In the case where the permission of the learning process has been accepted for the display, the learning execution unit may execute the learning process.

Both of the learning using the first model and the learning using the second model may be the reinforcement learning. The second condition may be at least one of the followings.

A value according to a reward obtained in the reinforcement learning using the second model is larger than that according to a reward obtained in the reinforcement learning using the first model.

The fluctuation range of the reward obtained in the reinforcement learning using the second model exceeds that of the reward obtained in the reinforcement learning using the first model.

The system may include a reliability/first model update unit (for example, the "reliability/base model update unit" 115) executing a reliability/first model update process (for example, the "reliability/base model update process" S311). In the case where second reliability on the basis of a second error between second simulation result data output from the second model by inputting a second control signal string to the second model in the case where the learning process has been finished without satisfying the second condition and real world data output from the machine into which the second control signal string has been input exceeds the first reliability, the reliability/first model update process includes updating the second reliability to new first reliability and updating to a new first model a model as a result of applying the third model with a ratio based on the new first reliability to the first model. The new first model may be used in the learning process for each reliability/first model update process.

The system may include an evaluation unit. The evaluation unit may display at least one of simulation result data output from the second model by inputting the second control signal string to the second model in the case where the learning process has been finished without satisfying the second condition and the first reliability. In the case where permission of actual operation confirmation of the machine has been accepted for the display, the evaluation unit may input the second control signal string to the machine.

The machine may be an industrial machine such as the "overhead crane" 001 or the "arm wagon" 901. If the actual machine is an industrial machine, there is a possibility that a load on an experiment is more increased. Thus, if the machine subject to the automatic operation control is an industrial machine, it can be expected that the present invention is more useful.

Some embodiments have been described above. However, these are exemplifications to describe the present invention, and the scope of the present invention is not intended to be limited to only these embodiments. The present invention can be carried out in other various modes.

What is claimed is:

1. An automatic operation control system for controlling an automatic operation of a machine, comprising:
a central processing unit (CPU) programmed to
set a first model showing a relation between a control signal string input to the machine on the basis of a mathematically-described function and data output from the machine controlled in accordance with the control signal string;
execute a learning process including to learn automatic operation control of the machine; and
control the automatic operation of the machine by inputting a control signal string in accordance with the result of the learning process into the machine,
wherein in the learning process, the CPU executes learning using the first model until a first condition is satisfied, and executes, after the first condition is satisfied, learning using a second model that is a model after the first model is changed one or more times until a second condition meaning overlearning is satisfied or the learning is finished without satisfying the second condition.

2. The automatic operation control system according to claim 1,
wherein the second model is a model as a result of applying to the first model a predetermined ratio of a mathematically-described third model that is different from the first model.

3. The automatic operation control system according to claim 2, wherein the CPU is further programmed to calculate first reliability on the basis of a first error between first simulation result data output from the first model into which a first control signal string has been input and first real world data output from the machine into which the first control signal string has been input,
wherein the predetermined ratio is a ratio smaller than the calculated first reliability.

4. The automatic operation control system according to claim 3,
wherein the first condition is a condition based on the first reliability and the number times of learning.

5. The automatic operation control system according to claim 3, wherein the CPU is further programmed to generate the third model that is a model to which the first model is adjusted so that the first error falls within an allowable error range.

6. The automatic operation control system according to claim 1,
wherein in the case where the second condition is satisfied, CPU finishes the learning process.

7. The automatic operation control system according to claim 3,
wherein the CPU displays at least one of the first error and the first reliability, and
wherein in the case where permission of the learning process has been accepted for the display, the CPU executes the learning process.

8. The automatic operation control system according to claim 1,
wherein both of the learning using the first model and the learning using the second model are reinforcement learning,
wherein the second condition is at least one of the followings:
a value according to a reward obtained in the reinforcement learning using the second model is larger than that according to a reward obtained in the reinforcement learning using the first model; and
the fluctuation range of the reward obtained in the reinforcement learning using the second model exceeds that of the reward obtained in the reinforcement learning using the first model.

9. The automatic operation control system according to claim 3, wherein the CPU is further programmed to execute, in the case where second reliability on the basis of a second error between second simulation result data output from the second model by inputting a second control signal string to the second model in the case where the learning process has been finished without satisfying the second condition and second real world data output from the machine into which the second control signal string has been input exceeds the first reliability, a reliability/first model update process that includes updating the second reliability to new first reliability and updating to a new first model a model as a result of applying the third model with a ratio based on the new first reliability to the first model, wherein the new first model is used in the learning process for each reliability/first model update process.

10. The automatic operation control system according to claim 3, wherein the CPU displays at least one of second simulation result data output from the second model by inputting the second control signal string to the second model in the case where the learning process has been finished without satisfying the second condition and the first reliability, and inputs the second control signal string to the machine in the case where permission of actual operation confirmation of the machine has been accepted for the display.

11. The automatic operation control system according to claim 10, wherein the CPU is further programmed to execute, in the case where second reliability on the basis of a second error between second real world data output from the machine into which the second control signal string has been input and second simulation result data exceeds the first reliability, a reliability/first model update process that includes updating the second reliability to new first reliability and updating to a new first model a model as a result of applying the third model with a ratio based on the new first reliability to the first model, wherein the new first model is used in the learning process for each reliability/first model update process.

12. The automatic operation control system according to claim 1, wherein the machine is an industrial machine.

13. An automatic operation control method for controlling an automatic operation of a machine, comprising the steps of:

setting a first model showing a relation between a control signal string input to the machine on the basis of a mathematically-described function and data output from the machine controlled in accordance with the control signal string;

executing a learning process including to learn automatic operation control of the machine; and controlling the automatic operation of the machine by inputting a control signal string in accordance with the result of the learning process into the machine, wherein in the learning process, learning is executed using the first model until a first condition is satisfied, and after the first condition is satisfied, learning is executed using a second model that is a model after the first model is changed one or more times until a second condition meaning overlearning is satisfied or the learning is finished without satisfying the second condition.

\* \* \* \* \*